United States Patent
Hussain

(10) Patent No.: US 8,886,846 B2
(45) Date of Patent: Nov. 11, 2014

(54) FLEXIBLE IMPLEMENTATION OF SERIAL BUS SUPPORT OVER DISPLAY INTERFACE

(71) Applicant: ATI Technologies ULC, Markham (CA)

(72) Inventor: Syed Athar Hussain, Scarborough (CA)

(73) Assignee: ATI Technologies ULC, Markham (CA)

(*) Notice: Subject to any disclaimer, the term of this patent is extended or adjusted under 35 U.S.C. 154(b) by 0 days.

(21) Appl. No.: 13/671,044

(22) Filed: Nov. 7, 2012

(65) Prior Publication Data

US 2014/0129738 A1  May 8, 2014

(51) Int. Cl.
   *G06F 13/12* (2006.01)
(52) U.S. Cl.
   USPC .................................. 710/8; 710/33; 710/72
(58) Field of Classification Search
   None
   See application file for complete search history.

(56) References Cited

U.S. PATENT DOCUMENTS

| | | | |
|---|---|---|---|
| 8,059,673 B2 | 11/2011 | Kobayashi | |
| 8,151,018 B2 * | 4/2012 | Mohanty et al. | 710/51 |
| 8,615,611 B2 * | 12/2013 | Hall | 710/8 |
| 2011/0016332 A1 | 1/2011 | Wu et al. | |
| 2014/0129738 A1 | 5/2014 | Hussain | |

OTHER PUBLICATIONS

International Search Report and Written Opinion for International Application No. PCT/IB2013/003066, Canadian Intellectual Property Office, Canada, mailed on Jul. 9, 2014 (12 pages).

* cited by examiner

*Primary Examiner* — Cheng-Yuan Tseng
(74) *Attorney, Agent, or Firm* — Volpe and Koenig, P.C.

(57) ABSTRACT

Systems and methods are used to configure a communication channel. A source device can dynamically map Display Port lanes to support both display devices and USB3.0 devices. A method for configuring a communication channel includes detecting a device connection event indicating a change to a configuration of the communication channel in response to a branch device of the communication channel satisfying a dynamic configuration capability criteria indicating that the communication channel is reconfigurable. Configuration parameters of a sink device in the communication channel are identified. The communication channel is reconfigured to carry a source data stream to the sink device based on the configuration parameters.

19 Claims, 5 Drawing Sheets

FLEXIBLE IMPLEMENTATION OF SERIAL BUS SUPPORT OVER DISPLAY INTERFACE

BACKGROUND OF THE INVENTION

1. Field of the Invention

The present invention relates generally to dynamically configuring a display interface to facilitate serial bus data communication between a source device and a sink device.

2. Background Art

Information handling systems generally allow data transmission between different electronic devices. For example, an information handling system may allow an exchange of data between a source device and one or more sink devices. The source device may generate a media or multimedia signal, such as video and/or audio, while the multiple sink devices can render the signal in an audio, visual, and digital manner. Industry standards such as DisplayPort®, High Definition Multimedia Interface (HDMI), Digital Visual Interface (DVI), Universal Serial Bus (USB), and the like, specify interface protocols for connecting a source device to a sink device. Generally, in order to transfer data using each protocol, separate ports dedicated to each interface need to be included as part of the source and sink device. Thus, separate cable connectors are then needed to connect the source device and sink devices in order to support different interface protocols. This provides a problem to an end-user who wants to avoid clutter and does not want numerous cable connectors between devices. Furthermore, thin and light form factors of computing devices (e.g., very thin laptops, tablets, smartphones, etc.) reduce the amount of physical space for connectors on these devices and hence a single multi-purpose connector is preferred. Thus, what is needed is the ability to have one cable connector that is able to support different interface protocols.

DisplayPort® is a digital display interface developed by the Video Electronics Standards Association (VESA). The DisplayPort standard provides requirements of connectors, cables, and data communication protocols for use in delivering isochronous streams of data within an information handling system. Isochronous streams of data include uncompressed digital packetized audio or video streams of data The DisplayPort includes a uni-directional main link for transporting such isochronous audio and video streams from a source device to a sink device. The main link may have 1, 2, or 4 pairs of communication channels enabled based on bandwidth limitations of the information handling system. Additionally, the DisplayPort standard provides for the bidirectional communication of control data within the information handling system over an auxiliary channel, which supports only 1 lane of communication. The DisplayPort interface is designed to support both internal chip-to-chip and external box-to-box digital display connections. Examples of internal chip-to-chip applications include usage within a laptop computer for driving a panel from a graphics controller and usage within a monitor or television for driving the display component from a display controller. Examples of box-to-box applications include display connections between a source device, e.g., a computer, and a sink device, e.g., monitors, projectors and television displays. Although the DisplayPort interface is primarily used to connect a video source to a display device, it can also be used to transmit other forms of data such as USB protocol data.

A Universal Serial Bus (USB) communication standard is a universal wired interface and protocol to enable electronic devices to exchange data. Various connectors are specified for information exchange in accordance with the standard. One or more dedicated USB ports, e.g., USB connectors, are typically employed in an electronic device. There are three basic types of connectors identified in various USB 2.0 specifications: Standard, Mini-USB, and Micro-USB connectors. In USB 3.0 specifications, two basic types of connectors are defined: standard, and micro-USB connectors. The USB port of a device is typically coupled to the USB port of another device via a cable. A USB transceiver may be employed in each device to send and receive USB protocol signals to and from the corresponding USB port devices. Examples of USB silk devices include a keyboard, mouse or external hard drive.

Although, the DisplayPort specifications indicate that the DisplayPort interface can be used to transmit USB protocol data, the DisplayPort specifications do not identify how this can be done specifically. Furthermore, current implementations of USB protocol data over the DisplayPort interface require one or more communication channels of the DisplayPort main link to be fixed to support transmission of USB data, while the remaining communication channels are dedicated to transmit video data to a display. One of the drawbacks of such a fixed configuration, for example, is that a display resolution of a sink device may suffer when there is not enough bandwidth to support both the display device requirements and a USB protocol device.

Therefore, what is needed is a technique to dynamically support the transmission of video, audio, and USB data over a display interface (such as, for example, a single DisplayPort cable) in a more intelligent way so that both audio and video data together with non-video/non-audio data over a serial bus (such as, for example, Universal Serial Bus 3.0 data) can be delivered to devices per user configuration and preference.

BRIEF SUMMARY OF EMBODIMENTS THE INVENTION

Exemplary embodiments of aspects of the invention can include apparatus and methods for configuring communication between a source and sink device are disclosed, where the source device can identify different kinds of sink devices and dynamically map communication channels based on either the capabilities of the sink devices or other configuration settings or commands.

An embodiment of aspects of the present invention provides a method for configuring a communication channel between a source device and a sink device. A device connection event is detected that indicates a change to a configuration of the communication channel. In response to a branch device of the communication channel satisfying a dynamic configuration capability criteria indicating that the communication channel is reconfigurable, configuration parameters of a sink device in the communication channel are identified. The communication channel is reconfigured to carry a source data stream to the sink device based on the configuration parameters.

Another embodiment of the present invention provides a reconfigurable data transmission system comprising a source device. The source device is configured to detect a device connection event indicating a change to a configuration of a communication channel. In response to a branch device of the communication channel satisfying a dynamic configuration capability criteria indicating that the communication channel is reconfigurable, the source device identifies configuration parameters of a sink device in the communication channel. The source device reconfigures the communication channel to carry a source data stream to a sink device based on the configuration parameters.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate the present invention and, together with the description, further serve to explain the principles of the invention and to enable a person skilled in the relevant art(s) to make and use the invention.

Figure 1:
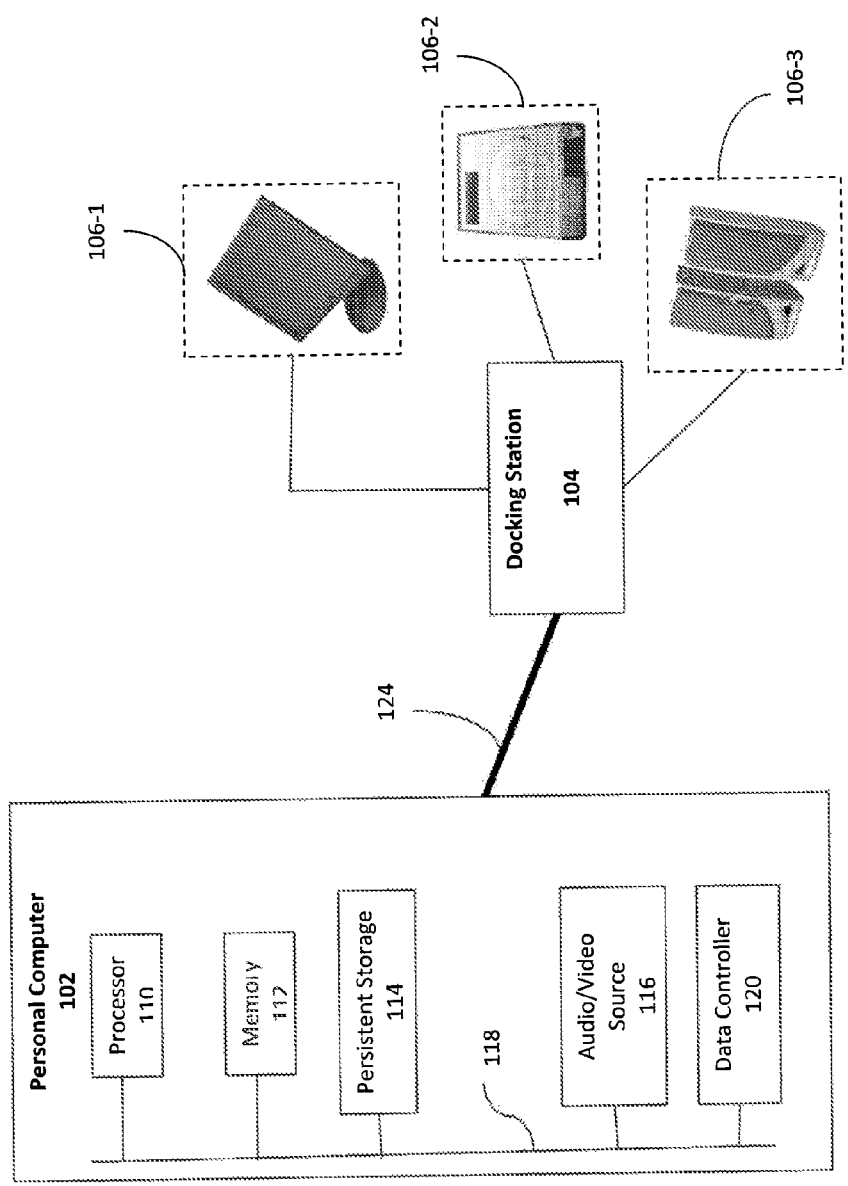
FIG. 1 illustrates an information handling system, according to an embodiment of the present invention.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION OF EMBODIMENTS OF THE INVENTION

This specification discloses one or more embodiments that incorporate the features of this invention. The disclosed embodiment(s) merely exemplify the invention. The scope of the invention is not limited to the disclosed embodiment(s). The invention is defined by the claims appended hereto.

The embodiment(s) described, and references in the specification to "one embodiment", "an embodiment", "an example embodiment", etc., indicate that the embodiment(s) described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is understood that it is within the knowledge of one skilled in the art to effect such feature, structure, or characteristic in connection with other embodiments whether or not explicitly described.

Embodiments of the invention may be implemented in hardware, firmware, software, or any combination thereof. Embodiments of the invention may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact result from computing devices, processors, controllers, or other devices executing the firmware, software, routines, instructions, etc.

Before describing such embodiments in more detail, however, it is instructive to present an example environment in which embodiments of the present invention may be implemented.

Embodiments of the present invention can enable the dynamic configuration of a communication channel between a source device and a sink device. While the present invention is described herein with illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility.

Embodiments of the present invention can be used in any computer system, computing device, entertainment system, media system, game systems, or any system where one or more transmission links connect a source device and a sink device. The present invention is particularly useful where the system comprises isochronous data streams. Uncompressed audio and video data streams are examples of isochronous data streams. For example, a flat panel television display receiving an uncompressed audio and video stream from a DVD player would require the rate at which the DVD player streamed the data, in order to properly render the received data streams in the display.

FIG. 1 is an information handling system, according to an embodiment of the present invention. System 100 can be a system for displaying video content in multiple displays, generating sound in multiple audio speakers, and storing or retrieving data from multiple external hard drives. In one example, system 100 includes a computer 102, docking station 104, display 106-1, external hard drive 106-2, audio speakers 106-3, and interface 124.

In one example, computer 102 includes a processor 110, a memory 112, a persistent storage 114, an audio/video source 116, a communication infrastructure 118, and a data controller 120. Processor 110 can be one or more central processor units (CPUs) or other processor and controls the operation of the system 100. Memory 112 includes a dynamic memory such as dynamic random access memory (DRAM) for storing data and instructions during the operation of the system. Examples of computer 102 may include convention desktop and notebook computers, servers, tablets, smartphones, home theater devices, settop boxes, advanced media players (e.g., Blu-Ray™ players), media computers (also sometimes referred to as home theater PCs), and other devices capable of outputting media data to a sink.

In one example, persistent storage 114 includes a persistent digital data storage medium such as a hard disk, optical disc, or flash memory. Persistent storage device 114 can be used, for example, to store data such as video/audio data and instructions persistently. Communication infrastructure 118 can include one or more communication busses, such as, but not limited to, a Peripheral Component Interface (PCI) bus, PCI express bus, or Advanced Microcontroller Bus Architecture (AMBA) bus. According to an embodiment, communication infrastructure 118 can communicatively couple the various components of personal computer 102.

In one example, audio/video source 116 includes one or more audio and video sources that generate content for display in the display 106-1 and/or sound in audio speakers 106-3. According to an embodiment, audio/video source 116 can include a DVD player, a set-top box, or other audio and video content generator. Audio/video source 116 can also include one or more interfaces communicatively coupling personal computer 102 to remote audio/video content generators or audio/video sources. For example, audio/video source 116 can include a network interface over which streaming audio and video content is received from a network such as the Internet.

Data controller 120 may be coupled to numerous other hardware or software components in, for example, a computer system. Data controller 120 may be a dedicated graphics card or sound card that plugs into the motherboard of a computer system, a part of another component card that plugs into the motherboard, or an integrated part of the motherboard. For example, data controller 120 may plug into a Peripheral Component Interface (PCI) bus through which the CPU of the computer system connects to other components of the computer system.

In one example, interface 124 can include a plurality of interfaces that communicatively couple the personal computer 102 to the display 106-1, external hard drive 106-2, and audio speakers 106-3. Interfaces 124 may support one or more of interface standards, such as, but not limited to, DisplayPort interface standard, High Definition Multimedia Interface (HDMI) standard, Digital Visual Interface (DVI), Video Graphics Array (VGA) or its variants, Low Voltage Differential Signaling (LVDS), USB cable, and Audio cable. Additional examples may include wireless interfaces such as wireless display (WiDi) from Intel Corporation, wireless DisplayPort and others.

Docking station 104 can include any kind of docking station cable of providing ports for connection to display 106-1, external hard drive 106-2, and audio speakers 106-3. Display 106-1, external hard drive 106-2, and audio speakers 106-3 plug into docking station 104 and communicates device connection information from each device to personal computer 102.

Display 106-1 can include any kind of display capable of displaying content received from computer 102. Display 106-1 can be any display or screen such as a cathode ray tube (CRT) or a flat panel display. Flat panel displays come in many forms, LCD, electroluminescent displays (ELD) and active-matrix thin-film transistor displays (TFT) being examples. Display 106-1 may receive data to be displayed, locations on the display to be updated, as well as any timing information, over interface 124.

External hard drive 106-2 can include any kind of hard drive capable of storing and retrieving digital content from personal computer 102. External hard drive 106-2 can include one or more rigid rapidly rotating discs coated with magnetic material, and with magnetic heads arranged to read and write data, for example.

Audio speakers 106-3 can include any kind of multimedia speakers capable of emitting sound content received from personal computer 102. Audio speakers 106-3 can include, for example, pairs of wide-band speakers mounted in separate housings. Audio speakers 106-3 generally include a pair of amplifiers that provide amplified right and left audio signals from personal computer 102 to a corresponding left and right speaker.

In one example, data and control information is transferred over interface 124 to display 106-1, external hard drive 106-2, and audio speakers 106-3. The data transmitted over interfaces 124 can include graphics data related to the video content, audio data related to the audio content and digital data related to the data to be sent to external hard drive 106-2. Control information transmitted over interface 124 enables synchronization and configuration of display 106-1, external hard drive 106-2, and audio speakers 106-3 with computer 102.

Figure 2:
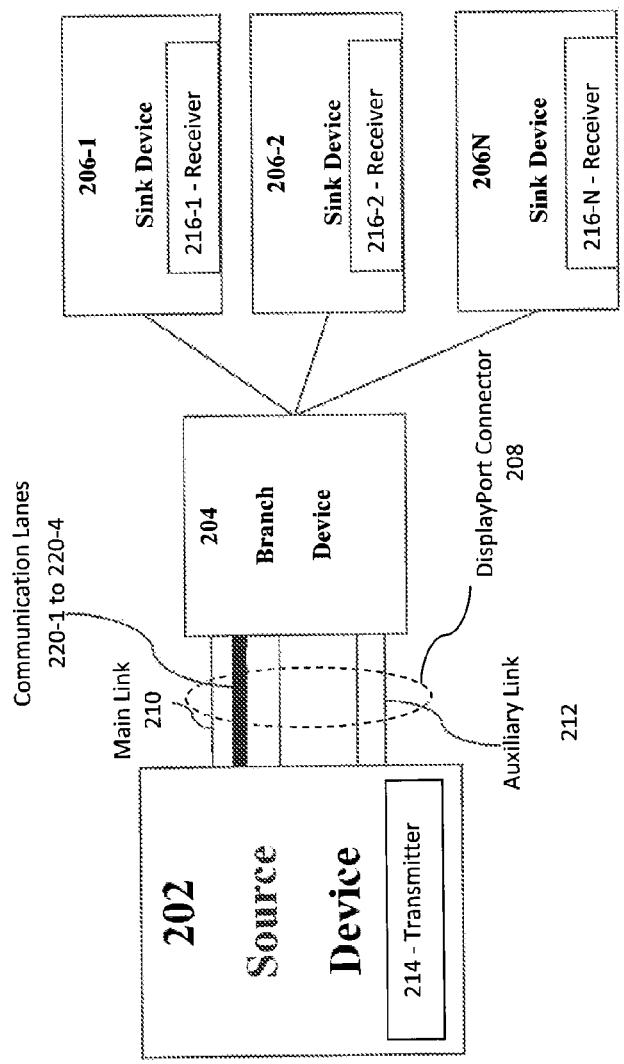
FIG. 2 shows a system including a source device, branch device, and multiple sink devices, according to an embodiment of the present invention.

FIG. 2 illustrates an information management system including a source device, a branch device, and a sink device, according to an embodiment of the present invention. In one example, system 200 includes a source device 202, a branch device 204, multiple sink devices 206-1 to 206-$n$, n being a positive integer, and DisplayPort connector 208 DisplayPort connector 208 includes at least one of a main link 210 and an auxiliary link 212. Main link 210 provides data from the source device 202 to the sink devices 206-1 to 206-$n$. In one example, system 200 is a multichannel video, audio, and data system in which a branch device 204 (e.g., a docking station 104 shown in FIG. 1) distributes an input video, audio, and/or data stream from source device 202 (e.g., a computer 102 shown in FIG. 1) to the separate sink devices 206-1 to 206-$n$ (e.g., display 106-1, external hard drive 106-2, and audio speakers 106-3 shown in FIG. 1).

DisplayPort connector 208 includes functionality for transporting data from the source device 202 to the branch device 204 and the multiple sink devices 206-1 to 206-$n$. DisplayPort connector 208 can include 1, 2, or 4 pairs of communication channels 220-1 to 220-4 enabled based on bandwidth limitations of system 200, user configuration, or user preference. Alternatively or additionally, DisplayPort connector 208 provides functionality for the bidirectional communication of data from the branch device 204 and the multiple sink devices 206-1 to 206-$n$ to source device 202 via 1 communication channel of auxiliary link 212.

In one example, source device 202 can be, without limitation, a video or audio streaming device such as a Blu-Ray player, DVD decoder, CD player, digital camera, or MP3 player. Source device 202 can also be a computer or other computing device that generates a source stream of data such as isochronous data (e.g., uncompressed audio and video data streams). Source device 202 can also include functionality to reconfigure the unidirectional communication 220-1 to 220-4 of DisplayPort connector 208 to the branch device 204 based on configuration parameters of the multiple sink devices 206-1 to 206-$n$.

In one example, the multiple sink devices 206-1 to 206-$n$ can be, for example, and without limitation, a television display, a computer display, an audio speaker system, or any USB 2.0 or USB 3.0 protocol device such as an external hard drive or controllers. In another example, the multiple sink devices 206-1 to 206-$n$ can be an intermediate device, such as an audio or video receiver, that can perform various processing functions on the audio and/or video streams before the streams are sent to a rendering device such as a display or speaker system. In a further example, sink devices 206-1 to 206-$n$ represent a device that uses the source data stream transmitted from source device 202 to perform various functions, e.g., rendering the source data stream, further processing of the source data stream, etc. In a still further example, sink devices 206-1 to 206-$n$ can receive a source data stream from source device 202 and can provide configuration parameters of the sink devices 206-1 to 206-*n* to source device 202.

In one example, branch device 204 is an intermediate device that takes as input an incoming source data stream from source device 202, and performs processing functions on the source data stream prior to the source data stream being transmitted to the separate sink devices 206-1 to 206-*n*. For example, and without limitation, branch device 204 can be, inter alia, a repeater device, a converter, a replicator device, or a composite device. A repeater device, for example, receives the source data stream and retransmits it to the separate sink devices 206-1 to 206-*n* at a higher level or higher power.

In one example, source device 202, sink device 206, main link 210, auxiliary link 212, and communication channels 220-1 to 220-4 operate according to a known standard, such as DisplayPort® versions 1.0, 1.1, 1.2, or one of its variants. DisplayPort versions 1.0, 1.1 and 1.2, for example, specify that main link 210 is unidirectional from source device 202 to sink device 206, and that main link 210 can comprise of 1, 2 or 4 communication channels. Auxiliary link 212, according to the DisplayPort specifications, is used for the bidirectional exchange of secondary information including information such as bandwidth requirements that can be handled by sink devices 206-1 to 206-*n*

In one example, main link 210 is a transmission link over which data and control information can flow between source device 202 and sink devices 206-1 to 206-*n*. Main link 210 can include one or more physical transmission media, such as, wired or wireless connections between source device 202, branch device 204, and sink device 206-1 to 206-*n*. For example, a transmitter 214 in source device 202 and a receiver 216-1 in sink device 206-1 can coordinate transmission of the source data stream from source device 202 over main link 210. The source data stream being transmitted may be distributed over the main link 210 at a symbol level, e.g., an equal number of bits from each symbol can be transmitted over each of the available communication channels 220-1 to 220-4. A symbol is a pulse in a digital transmission representing an integer number of bits. For example, source device 202 can transmit symbols over the main link 210 at a fixed and known symbol rate, while sink devices 206-1 to 206-*n* detects the sequence of symbols in order to reconstruct the transmitted data. There may be a direct correspondence between a symbol and a small unit of data (for example, each symbol may encode one or several binary digits or 'bits') or the data may be represented by the transitions between symbols or even by a sequence of many symbols.

In an embodiment, communication channels 220-1 to 220-4 are logical channels carrying a source data stream over main link 210. In another embodiment, communication channels 220-1 to 220-4 are logically overlaid on main link 210, and can utilize one or more of the separate communication channels 220-1 to 220-4 of main link 210. One or more of the communication channels 220-1 to 220-4 may be enabled over main link 210.

Communication channels 220-1 to 220-4 can be used to carry an isochronous data stream from source device 202 to sink devices 206-1 to 206-*n*. For example, a first communication channel 220-1 and a second communication channel 220-2 can be used for carrying a video data stream from a computer acting as a source device 202, and a third communication channel 220-3 and a fourth communication channel 220-4 can carry an audio stream. Alternatively, the same communication channels 220-1 to 220-4 can carry all source data stream types.

Additionally, or alternatively, an auxiliary link 212 can be used, for example, for the bi-directional transfer of control information between source device 202 and sink devices 206-1 to 206-*n*. In an embodiment, auxiliary link 212 can be used by sink devices 206-1 to 206-*n* to communicate the data receiving capability of the sink device 206-1 to 206-*n*, such as the maximum supported bandwidth to source device 202, so that source device 202 can reconfigure the communication channels 220-1 to 220-4 to support different kinds of sink devices 206-1 to 206-*n*, as discussed above.

In one example, with reference to both FIGS. 1 and 2, systems 100 and 200 can comply with the DisplayPort standard, or one or more of its variants. Accordingly, main link 210 can be a unidirectional link used for the transport of isochronous data streams. Each isochronous data stream can, for example, be transmitted within communication channels 220-1 to 220-4. For example, an isochronous data stream, such as a video stream that is generated in source device 202, can be transmitted from source device 202 to branch device 204 over DisplayPort connector 208. Branch device 204 then distributes the stream of data to sink devices 206-1 to 206-*n*, e.g., display monitors, audio speakers, external hard drives, controllers, etc.

In an embodiment, the one or more of sink devices 206-1 to 206-*n* can include USB devices. When USB devices are connected to branch device 204, data exchange between the source device 202 and the one more USB sink devices 206-1 to 206-*n* takes place in a similar technique as described above. In an embodiment, one or more of communication channels 220-1 to 220-4 can be dedicated to handle USB data. For example, communication channels 220-3 and 220-4 can be configured to exclusively handle the exchange of data between the one or more USB sink devices 206-1 to 206-*n* and the source device 202. In such a scenario, communication channels 220-3 and 220-4 are configured to handle data exchange for USB sink devices, while communication channels 220-1 and 220-2 are dedicated to other types of sink devices, such as a display.

Figure 3:
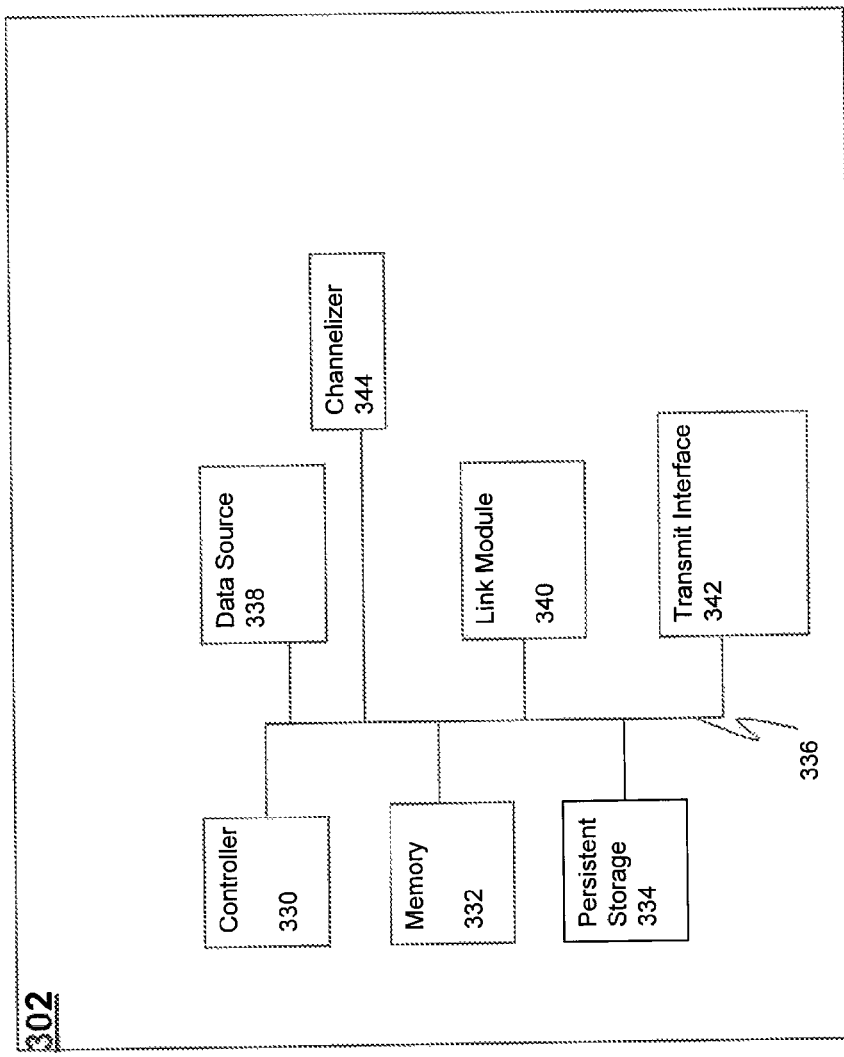
FIG. 3 shows a source device, according to an embodiment of the present invention.

FIG. 3 shows a source device 302 according, to an embodiment of the present invention. In one example, source device 302 includes a controller 330, a memory 332, a persistent storage 334, a communication bus 336, a data source 338, a link module 340, a transmit interface 342, and a channelizer 344.

In one example, controller 330 may be any one or more processors including a central processor unit (CPU) or graphics processor unit (GPU). In one example, controller 330 controls the operation of devices in source device 302. For example, controller 330 can execute logic instructions implementing one or more of, link module 340, transmit interface 342, and channelizer 344. The logic instructions of link module 340, transmit interface 342, and channelizer 344 can be implemented in software, hardware, firmware, or a combination thereof.

In one example, memory 332 includes one or more memory devices, for example, dynamic random access memory (DRAM) devices. Memory 332 can be used to store logic for different modules of source device 302 including link module 340, transmit interface 342, and channelizer 344, as needed for execution. Memory 332 can also be used to buffer incoming stream data from data source 338 to transmit interface 342.

In one example, persistent storage 334 can include one or more persistent storage devices such as magnetic disk, optical disk, flash memory, etc. Persistent storage 334 can store the logic of link module 340, transmit interface 342, and channelizer 344, as necessary. For example, in one embodiment, persistent storage 334 stores all portions of link module 340, transmit interface 342, and channelizer 344 that are implemented in software in executable form to be loaded into memory 334 upon startup of source device 302.

Communication bus 336 couples components of source device 302, such as two or more of the components discussed above in order to allow communication between the different components. Communication bus 304 may include a Peripheral Component Interface (PCI) bus or one of its variants, Universal Serial Bus (USB), Firewire, Ethernet, or a like device.

In one example, data source 338 can be any device that produces a source data stream. For example, a computer providing video, music, or general data can be included in data source 338. In one embodiment, data source 338 can be a computer including DVD playback software that decodes and uncompresses video data stored on the DVD before the data is sent to transmit interface 342. For example, the DVD video data may be stored using Motion Picture Experts Group version 2 (MPEG2) video compression standard. Data source 338 can uncompress the MPEG2 video in accordance with the MPEG2 standard, and inject the uncompressed video data into link module 340 to be transmitted, e.g., to be rendered on a display or stored on an external hard drive.

In one example, transmit interface 342 includes the functionality to receive an outgoing data stream from, for example, link module 340 and to send it out over a transmission link. Transmit interface 342 may also include functionality to transmit data, as appropriate, over a main link and an auxiliary link in systems where both types of links exist. In one example, channelizer 344 can be implemented as part of the link module 340 or as a separate module. In one example, channelizer 344 includes functionality to receive the source data stream from data source 338 and to initiate one or more communication channels to transmit that source data as one or more source data streams to a sink device. The initiation of a communication channel can include creating an identifier for the communication channel, and transmitting the appropriate identifier with the corresponding stream data. In an embodiment, initiation of a communication channel involves the exchange of messages with sink devices and branch devices (e.g., sink devices 206-1 to 206-n and branch device 204 of FIG. 2). An exchange of messages prior to setting up a communication channel, for example, enables the dynamic configuration of the communication channels based on the sink device types, bandwidth requirements, and configuration parameters of the sink devices.

Figure 4:
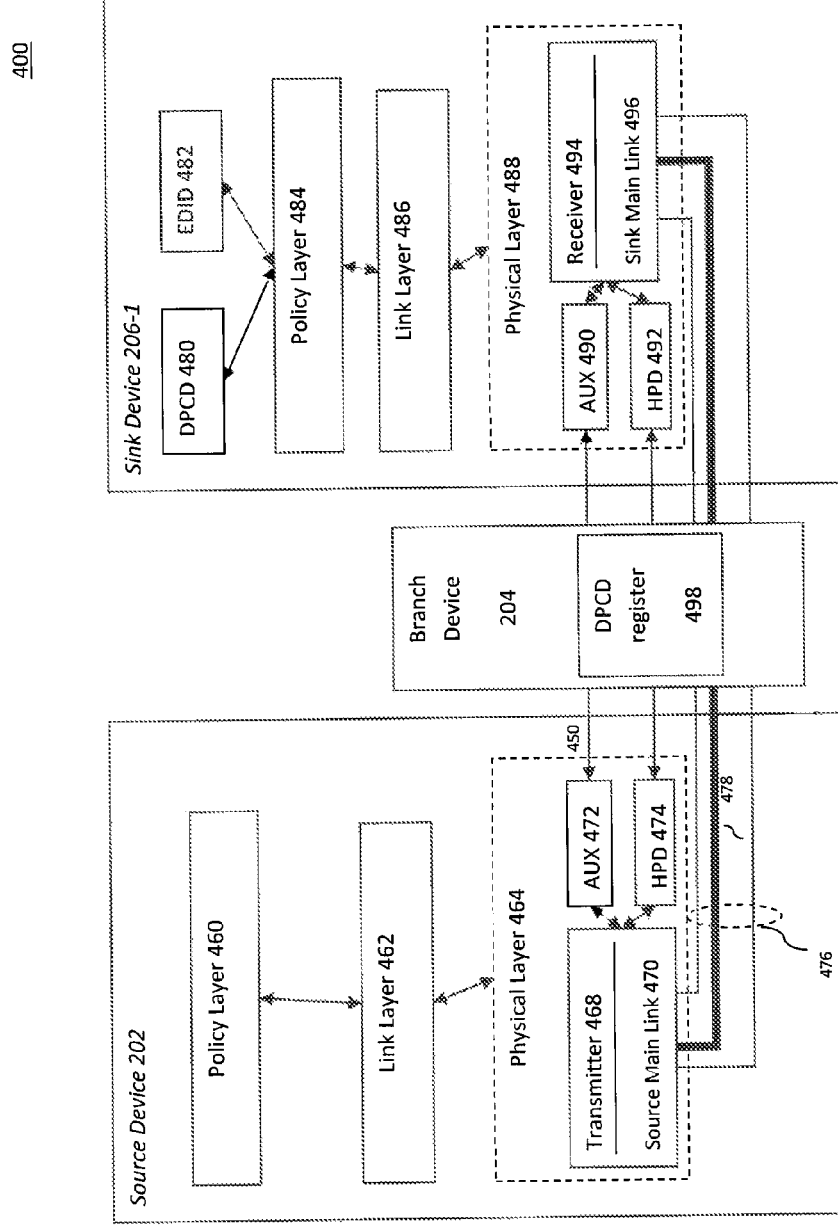
FIG. 4 shows a detailed block diagram of a sink device and source device, according to an embodiment of the present invention.

A person of skill in the art would understand that source device 302 can include components or modules in addition to those shown, or different combinations thereof. It should also be noted that the functionality of data source 338, link module 340, transmit interface 342, and channelizer 344 can be implemented in software, firmware, hardware, or a combination thereof. In an embodiment, for example, the functionality of data source 338, link module 340, transmit interface 342, and channelizer 344 is specified in a hardware description language such as Verilog, RTL, netlists, to enable ultimately confgguring a manufacturing process through the generation of maskworks/photomasks to generate a hardware device embodying aspects of the invention described herein FIG. 4 shows a system 400, in accordance with an embodiment of the invention. For example, system 400 includes a source device, e.g., source device 202, a branch device, e.g., branch device 204, and a sink device, e.g., sink device 206-1.

In one example, source device 202 uses DisplayPort source auxiliary channel 472 to communicate control data. In an embodiment, source device 202 includes a source policy layer 460, a source link layer 462, and source physical layer 464. Source physical layer 464 can include a transmitter 468, a source main link interface 470, a source auxiliary channel 472, and a hot plug detect (HPD) channel 474. Source link layer 462 provides services as requested by the source policy layer 460. Additionally, source link layer 462 monitors the connection to sink device 206-1 and provides services to maintain synchronization of the connection. Source policy layer 460 determines how to transport the source data stream from source device 202, as discussed previously.

In one example, sink device 206-1 includes a sink policy layer 484, a sink link layer 486, a sink physical layer 488, DisplayPort configuration data (DPCD) 480, and device identification data (DID) 482. The sink physical layer 488 of sink device 206-1 includes an auxiliary channel interface 490, a hot plug detect channel 492, a sink device receiver 494, and a sink device main link interface 496. Similar to the source link layer 462 of the source device 202, sink link layer 486 provides services as requested by the sink policy layer 484, which manages how to transport the source data stream. Sink link layer 486 also manages the connection with source device 202 and is responsible for keeping the connection synchronized. In general, a source data stream is transported via source link layer 462 to transmitter 468 of source device 202. Source main link interface 470 is then responsible for transmitting the source data stream to the sink device 206-1. Source data stream information is then passed over DisplayPort connector 476 to branch device 204 and subsequently to sink device 206-1 via main link interface 496. DisplayPort connector 476 includes configuration lanes 478 (lanes 0 through 4). In an embodiment, the configuration lanes 478 of DisplayPort connector 476 are dynamically mapped to sink device 206-1 and any other sink device connected to branch device 204 based on a type of the sink devices and bandwidth requirements.

In this embodiment, once received, the source data stream information is conveyed from the sink device main link interface 496 to the sink device receiver 494. Sink link layer 486 then transfers the source data stream information to sink policy layer 484. The source data stream information may be a source stream of data, such as video information or digital information to be displayed by sink device 206-1, if sink device 206-1 is a display or accessed by sink device 206-1, if sink device 206-1 is an external hard drive, for example.

In this example operation, initiation of the source device 202 triggers a transaction request from source device 202 to sink device 206-1. Sink device 206-1 accordingly responds with a reply transaction. In another embodiment, sink device 206-1, via branch device 204, may monitor the communication channel 478 to detect initiation of the source device 202. Source device 202 may be initiated, for example, by a user turning on the power of source device 202. When source device 202 is initiated, a change in power voltage is detected by HPD interface 474. The change in the power voltage results in the generation of a HPD event by the sink device 206-1, which is communicated via HPD interface 492. The HPD event signal is received by HPD interface 474 of the source device, and is then communicated via the source link layer 462 to the source policy layer 460.

In an embodiment, a HPD event signal is received by source device 202 in response to a device connection event. The device connection event indicates a change to a configuration of the communication channel 478 in response to a branch device 204 of the communication channel 478 satisfying a dynamic configuration capability criteria indicating that the communication channel 478 is reconfigurable. Source policy layer 460 triggers a DPCD, which is passed to the source link layer 462 and subsequently to AUX channel interface 472. A DPCD read operation is a request generated by the source device 202 to retrieve configuration data from the DPCD register 498 of branch device 204. After its receipt, the DPCD read operation is passed to the branch device 204. Upon receipt of the DPCD read operation command, a DPCD read operation of a DPCD register 498 is performed in order to determine the dynamic configuration capabilities of the branch device 204.

In an embodiment, the dynamic configurations capabilities of the branch device 204 is determined by comparing branch device capability data stored in the DPCD register 498 to a predetermined dynamic configuration value. In an embodiment, branch device 204 includes DPCD register 498 with a portion of the register space allocated to hold branch device capability data related to the dynamic configuration abilities of the branch device. The DPCD register 498 includes data that describes the capabilities of the branch device capabilities and stores the connection status of any sink devices attached, e.g., sink device 206-1. While embodiments described herein discuss a DPCD register included on the branch device, source device 202 and sink device 206-1 can also include a DPCD register or any other kind of configuration register that stores capability data of any device within system 400.

A dynamic configuration capability of the branch device 204 can indicate that the branch device 204 allows the communication channels 478 between the source device 202 and branch device 204 to be dynamically reconfigured based on the types of sink devices present, e.g., sink device 206-1. For example, the communication channels 478 may be reconfigured to support both a display device and a USB 2.0 or USB 3.0 device, if those devices are present.

In an embodiment, the predetermined dynamic configuration value is a hard coded data value. In another embodiment, a dynamic configuration capability of the branch device 204 is determined based on a level of matching of the branch device capability data and the predefined dynamic configuration value. For example, a bit comparison of the branch device capability data and the predefined dynamic configuration value can be performed, where a branch device 204 is determined to have a dynamic configuration ability when a certain number of bits match, or when a specific bit of the branch device capability data is set to 1.

In this example, a device identification read operation is then performed to determine the sink device type and configuration parameters of the sink device 206-1. A device identification read operation is a request from the source device 202 for configuration parameters related to the sink device 206-1 attached to branch device 204 Such configuration parameters can include the maximum or minimum bandwidth required by the sink device 206-1. Once the device identification read operation is received by the AUX channel interface 490 of the sink device 206-1, the device identification read operation comprising the command data 450 is passed from sink link layer 486 to sink policy layer 484. The sink policy layer 484 then performs a device identification read operation to retrieve the DID information 482 stored in the sink device 206-1. The retrieved DID information 482 is then returned to the source device 202 using the same communication path. For instance, the device identification information may indicate the device type along with the bandwidth requirements. The device type information can identify the sink device type as a display device or a USB3.0 device. In an example, an Extended Display Information Data (EDID) is a form of device identification information that may be retrieved from a display device. The EDID informs the source device of the capabilities of the display devices once it is connected.

Upon receipt of the device identification information, source device 202 includes functionality to reconfigure the communication channels 478 based on the received device identification information (configuration parameters). In an embodiment, the reconfiguration of the communication channels 478 include enabling or disabling one or more additional communication channels based on a device type of the sink device 206-1. For example, the device identification information may identify the sink devices attached to branch device 204 as including one or more display devices and/or one or more USB protocol devices. In such a scenario, source policy layer 460 is configured to reconfigure communication channels 478 (lanes 0, 1, 2, 3) to support the sink devices attached to branch device 204. Thus, 1, 2, or 4 lanes of communication may be enabled, where a certain number of lanes are devoted to the display sink devices while the other lanes are assigned to the USB devices. In an embodiment, the assignment of the communication channels 478 is based on either a predetermined configuration policy or a user-defined configuration policy. Such policies determine the priority or preference of the kinds of sink device with respect to division of bandwidth.

In an embodiment, when a sink device 206-1 is a USB device, the configuration between the sink device 206-1 and the source device 202 can be handled via a USB connection architecture (e.g., plug-and-play). Sink device 206-1 can include a plug-and-play USB device, which has a set of functionality that is accessible to the source device 202 through a plug-and-play interface. A plug-and-play device is a device that is automatically detected by an operating system of the source device 202 when the sink device connects to a branch device (i.e., branch device 204) or directly to a source device (i.e., source device 202). The plug-and-play device can include sets of functionality including, but not limited to, storage, input registration, image capturing, audio input and output, etc. The sets of functionality available on a plug-and-play device are pre-defined as device classes. Upon connection of a plug-and-play device to branch device 204 or directly to source device 202, an electronic circuit is completed and the operating system of the source device 202 is alerted to the connection. The operating system, in response, polls the plug-and-play device to determine what functionality is available on the plug-and-play device. Many operating systems of a source device can include a number of preloaded drivers for plug-and-play sink device classes, such as USB mass storage, a two-button mouse, etc. If the operating system includes a driver for the device class of the plug-and-play device connected to the source device 202, the source device 202 loads the driver so that the functionality of the plug-and-play device can be accessed by the source device 202. If the operating system does not include a driver corresponding to the device class of the plug-and-play device, the operating system usually prompts the user to install the appropriate software to enable the computer to access the functionality of the plug-and-play device.

In an embodiment, the operating system of the source device can be configured to monitor the arrival of an event indicating that a plug-and-play USB sink device has been connected to the branch device 204 or directly to the source device 202. An event is generated each time a sink device 206-1 is connected to system 400. In an embodiment, upon the connection of a sink device 206-1, the communication channels between the sink device 206-1 and the source device 202 can be configured based on a predetermined configuration policy set up by the user. In another embodiment, the user can configure the communication channels once the sink device 206-1 is connected. The operating system can include software that presents a user with an interface where the user can configure the communication channels between a source device and a sink device. For example, upon the connection of a sink device 206-1, the software running on source device 202 can generate a menu that provides the user with the ability to dedicate certain levels of bandwidth to specific devices. Once the user sets the amount of bandwidth that is dedicated to each sink device, the communication channels will be configured based on these bandwidth settings, similarly to as described above.

In another embodiment, configuration between a source device and a sink device can take place when the source device 202 does not have any power. Source device 202 may not have power if the source device 202 is powered off or if a battery of the source device 202 no longer has battery-life. In such a scenario, the branch device 204 can be configured to probe the source device 202 to determine if the source device 202 supports delivery of power. For example, the source device 202 may be a 1-wire device which includes a 1-wire self-powered Read Only Memory (ROM) which is configured to support power delivery to the source device 202 when the source device 202 does not have any power. A 1-Wire device includes a communications bus system that provides low-speed data, signaling, and power over a single signal for a device. In an embodiment, the branch device 204 can probe the source device 202 over the DisplayPort connection via the 1-wire ROM. The branch device 204 can be configured to use the 1-Wire ROM to query the source device 202 to determine the power capabilities of the source device 202. Specifically, the source device 202 can be probed to determine the voltage requirements of the source device 202. Once the voltage requirements are determined, the branch device 204 is configured to provide the source device 202 with the required voltage in order to charge the source device 202. The required voltage can be received from the sink device 206-1.

Figure 5:
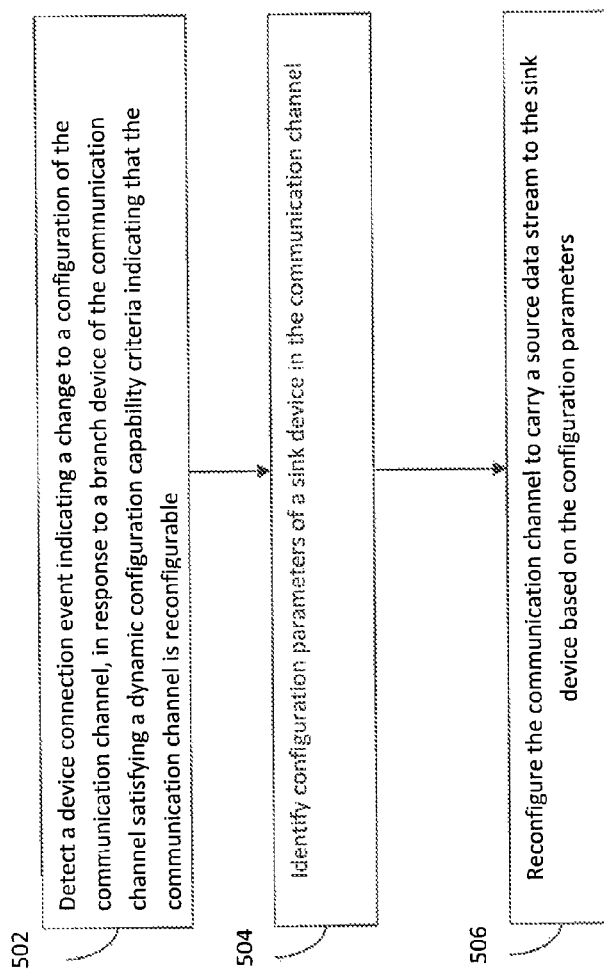
FIG. 5 shows a flowchart depicting a process implemented in a source device, according to an embodiment of the present invention.

FIG. 5 illustrates a flowchart depicting a process 500, according to an embodiment of the present invention. For example, process 500 can use source device 202 to reconfigure communication channels 220-1 to 220-4 between multiple sink devices, such as sink devices 206-1 to 206-n. Thus, in one example, process 500 can be performed by one or more of systems 100, 200, 300, and 400 discussed above. Reference is made for exemplary implementations to elements in these systems. It is to be appreciated that process 500 may not include all the operations shown, or perform the operations in the order shown.

At step 502, a device connection event is detected. Step 502 may be performed, for example, by HPD interface 474 of source device 202. As discussed previously, a device connection event indicates a change to a configuration of the communication channel. When a device connection event is detected, a branch device of the communication channel is analyzed to determine if it satisfies a dynamic configuration capability criteria indicating that the communication channel is reconfigurable. For example, upon a new sink device being connected to the branch device 204, HPD interface 476 of source device 202 will receive a hot plug event. In response, source device 202 generates a read operation which will be sent as a command to branch device 204, via a main link auxiliary channel. The read operation is performed in order to determine the dynamic configuration capabilities of the branch device 204, as discussed previously.

At step 504, configuration parameters of a sink device in the communication channel are identified. Step 502 may be performed, for example, by a source physical layer 464 of source device 202 and branch device 204. Once it is determined that the branch device supports dynamic configuration, source device 202 generates another read request to the branch device 204. In response, the branch device 204 performs a device identification operation to retrieve the device identification information stored for all the sink devices connected to branch device 204. The retrieved device identification information indicates the capabilities of each sink device connected. For example, the device identification information may include the device type along with the bandwidth requirements of the connected sink devices.

At step 506, the communication channel is reconfigured to carry a source data stream to the sink device based on the configuration parameters. For example, step 506 may be performed by a source policy layer 460 of source device 202. In an embodiment, reconfiguring the communication channel comprises enabling one or more additional communication channels based on a device type of the one or more sink devices connected to branch device 204. Reconfiguring of the communication channel occurs once all the types of the sink devices have been identified by source device 202. For example, source device 202 may identify the sink devices connected to branch device 204 as including a display device and a USB 3.0 device. In this instance, the communication channels 0, 1, 2, and 3 may be reconfigured to support both types of devices, as discussed previously.

In an embodiment, a bandwidth division for a source data stream is determined based on the configuration parameters of the sink devices and the communication channels are reconfigured accordingly. For example, a display sink device may require enough bandwidth to display resolutions up to and including 1900×1200 at 60 Hz (e.g., a 24" display). Once the bandwidth for the display sink device is satisfied the remaining bandwidth may be assigned to the USB 3.0 device. Thus, the communication channels may be divided such that lanes 0 and 1 are assigned to support the display device, while lanes 2 and 3 are assigned to support the USB 3.0 device.

In an embodiment, sink devices may be added or removed from branch device 204. In an embodiment, when a sink device is removed from the branch device one or more communication channels can be disabled based on a device type of the remaining sink devices. For example, if a USB 3.0 sink device is removed resulting in only a display sink device remaining, then the communication channels may be reconfigured such that 1, 2, or all 4 lanes may be used to support the bandwidth requirements of the display sink device In this way, the system supports dynamic configuration of a communication channel between a source device and one or more sink devices.

In an embodiment, the bandwidth division for the one or more sink devices of the configuration may be based on a predefined configuration policy. For example, a predefined configuration policy can indicate that display sink devices receive higher priority than any other kind of sink device types. Thus, when the sink devices connected to branch device 204 are analyzed, the sink devices which are identified as displays will have their bandwidth requirements given a higher priority and satisfied first. Alternatively, the bandwidth division for the one or more sink devices connected to branch device 204 may be based on a user defined configuration policy. For example, upon detection of a newly added sink device, a user may be presented with the option to set the priority of the devices. Thus, the bandwidth division is based on the priority selections of the user. In this way, a user may prioritize a USB 3.0 sink device ahead of a display device or vice versa. In the scenario in which a USB 3.0 device is given a higher priority than a display device, the resolution of the display device may be affected depending upon the available bandwidth.

As described above, the present invention allows a source device to reconfigure a communication channel between one or more sink devices based on the sink device types and bandwidth requirements. By identifying the kind of sink devices detected and having a branch device that supports reconfiguration, dynamic mapping of the communication channels between the source device and sink devices is enabled.

The above embodiments can provide reduced cost and flexibility as compared to conventional approaches. By monitoring the connection of sink devices and determining their respective requirements, optimum bandwidth for display devices and other kinds of devices, such as USB 3.0 are automatically configured.

The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A method for configuring a communication channel comprising:
   detecting a device connection event which initiates a change to a configuration of a plurality of communication channels;
   determining whether a branch device, which manages the plurality of communication channels, supports a reconfiguration of the plurality of communication channels based on the branch device satisfying a dynamic configuration capability criteria, the dynamic configuration capability criteria being satisfied based on device types of a plurality of sink devices connected to the branch device; and
   reconfiguring the plurality of communication channels to carry different source data streams to the plurality of sink devices based on configuration parameters of the plurality of sink devices and priorities associated with the plurality of sink devices.

2. The method of claim 1 further comprising:
   identifying the device type for each sink device of the plurality of sink devices; and
   in response to the device type of at least one of the sink devices being a USB3.0 device, reconfiguring the plurality of communication channels based on a configuration policy of the at least one sink device and bandwidth requirements associated with the plurality of sink devices.

3. The method of claim 1, wherein the detecting comprises:
   monitoring a physical link between a source device of the communications channel and the plurality of sink devices; and
   detecting a hot-plug event, wherein the hot-plug event indicates that another sink device has been added or removed from the configuration of the plurality of sink devices.

4. The method of claim 3 further comprising:
   detecting the source device is without power;
   querying the source device over one communication channel of the plurality of communication channels in order to determine voltage requirements of the source device; and
   providing, from the plurality of sink devices, power satisfying the voltage requirements, wherein the power charges the source device.

5. The method of claim 1, wherein the identifying comprises:
   retrieving device identification data for the plurality of sink devices; and
   determining the configuration parameters based on the retrieved device identification data.

6. The method of claim 2, wherein the reconfiguring comprises:
   enabling one or more additional communication channels based on the device type of each sink device of the plurality of sink devices;
   determining a bandwidth division for the different source data streams based on the configuration parameters of the plurality of sink devices and the priorities associated with the plurality of sink devices; and
   associating the one or more additional communication channels with a respective one of the plurality of sink devices based on the determined bandwidth division.

7. The method of claim 1, wherein the reconfiguring comprises:
   disabling one or more additional communication channels based on the device type of each sink device of the plurality of sink devices;
   determining a bandwidth division for the different source data streams based on the configuration parameters of the plurality of sink devices and the priorities associated with the plurality of sink devices; and
   associating the one or more additional communication channels with a respective one of the plurality of sink devices based on the determined bandwidth division.

8. The method of claim 2, wherein the reconfiguring is based of a predetermined configuration policy.

9. The method of claim 2, wherein the reconfiguring is based on a user-defined configuration policy.

10. A reconfigurable data transmission system, comprising:
   a source device,
   wherein the source device is configured to:
      detect a device connection event which initiates a change to a configuration of a plurality of communication channels,
      determine whether a branch device which manages the plurality of communication channels, supports a reconfiguration of the plurality of communication channels based on the branch device satisfying a dynamic configuration capability criteria, the dynamic configuration capability criteria being satisfied based on device types of a plurality of sink devices connected to the branch device,
and
reconfigure the plurality of communication channels to carry different source data streams to the plurality of sink devices based on configuration parameters of the plurality of sink devices and priorities associated with the plurality of sink devices.

11. The data transmission system of claim 10, wherein the source device is further configured to:
enable one or more additional communication channels based on the device type of each sink device of the plurality of sink devices;
determine a bandwidth division for the different source data streams based on the configuration parameters of the plurality of sink devices and the priorities associated with the plurality of sink devices; and
associating the one or more additional communication channels with a respective one of the plurality of sink devices based on the determined bandwidth division.

12. The data transmission system of claim 10, wherein the source device is further configured to:
disable one or more additional communication channels based on the device type of each sink device of the plurality of sink devices;
determine a bandwidth division for the different source data streams based on the configuration parameters of the plurality of sink devices and the priorities associated with the plurality of sink devices; and
associate the one or more additional communication channels with a respective one of the plurality of sink devices based on the determined bandwidth division.

13. A non-transitory computer-readable medium having instructions stored thereon, execution of which, by a computing device, causes the computing device to perform operations comprising:
detecting a device connection event which initiates a change to a configuration of a plurality of communication channels;
determining whether a branch device which manages the plurality of communication channels, supports a reconfiguration of the plurality of communication channels based on the branch device satisfying a dynamic configuration capability criteria, the dynamic configuration capability criteria being satisfied based on device types of a plurality of sink devices connected to the branch; and
reconfiguring the plurality communication channels to carry different source data streams to the plurality of sink devices based on configuration parameters of the plurality of sink devices and priorities associated with the plurality of sink devices.

14. The non-transitory computer-readable medium of claim 13, the operations further comprising:
determining a device type for each sink device of the plurality of sink devices; and
in response to the device type of at least one of the sink devices being a USB3.0 device, reconfiguring the plurality of communication channels based on a configuration policy of the at least one sink device and bandwidth requirements associated with the plurality of sink devices.

15. The non-transitory computer-readable medium of claim 13, the operations further comprising:
enabling one or more additional communication channels based on the device type of each sink device of the plurality of sink devices;
determining a bandwidth division for the different source data streams based on the configuration parameters of the plurality of sink devices and the priorities associated with the plurality of sink devices; and
associating the one or more additional communication channels with a respective one of the plurality of sink devices based on the determined bandwidth division.

16. The non-transitory computer-readable medium of claim 13, the operations further comprising:
disabling one or more additional communication channels based on the device type of each sink device of the plurality of sink devices;
determining a bandwidth division for the different source data streams based on the configuration parameters of the plurality of sink devices and the priorities associated with the plurality of sink devices; and
associating the one or more additional communication channels with a respective one of the plurality of sink devices based on the determined bandwidth division.

17. A method for configuring a communication channel comprising:
performing a device identification read operation to determine configuration parameters for a plurality of sink devices;
receiving device identification data information related to the plurality of sink devices;
determining whether a plurality of communication channels can be reconfigured based on device types of the plurality of sink devices satisfying a dynamic configuration capability criteria; and
reconfiguring the plurality of communication channels based on the device identification data information, wherein reconfiguring is based on the received identification data and priorities associated with the plurality of sink devices.

18. The method of claim 17, wherein a device identification read operation is performed on a configuration register of one of a source device, a branch device and the plurality of sink devices.

19. The method of claim 4, wherein the source device is queried utilizing a self-powered read only memory of the source device.

* * * * *